(12) United States Patent
Ito

(10) Patent No.: US 9,048,526 B2
(45) Date of Patent: Jun. 2, 2015

(54) RESONANT CIRCUIT AND ANTENNA DEVICE

(71) Applicant: Murata Manufacturing Co., Ltd., Nagaokakyo-shi, Kyoto-fu (JP)

(72) Inventor: Hiromitsu Ito, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 276 days.

(21) Appl. No.: 13/751,345

(22) Filed: Jan. 28, 2013

(65) Prior Publication Data

US 2013/0135172 A1     May 30, 2013

Related U.S. Application Data

(63) Continuation of application No. PCT/JP2011/067254, filed on Jul. 28, 2011.

(30) Foreign Application Priority Data

Jul. 29, 2010    (JP) ................................ 2010-170390

(51) Int. Cl.
   *H01Q 1/36*      (2006.01)
   *H01Q 7/00*      (2006.01)
   *G06K 19/077*    (2006.01)
   *H01Q 1/22*      (2006.01)
   *H01Q 1/38*      (2006.01)

(52) U.S. Cl.
   CPC ............ *H01Q 7/00* (2013.01); *G06K 19/07794* (2013.01); *H01Q 1/2225* (2013.01); *H01Q 1/38* (2013.01)

(58) Field of Classification Search
   USPC ................................ 343/742, 895; 340/572.5
   See application file for complete search history.

(56) References Cited

U.S. PATENT DOCUMENTS 4,369,557 A * 1/1983 Vandebult .................... 29/25.42
4,583,099 A * 4/1986 Reilly et al. .................. 343/895
(Continued)

FOREIGN PATENT DOCUMENTS

EP       0 142 380 A2    5/1985
EP       0 149 240 A2    7/1985
(Continued)

OTHER PUBLICATIONS

Official Communication issued in corresponding United Kingdom Patent Application No. 1301444.4, mailed on Oct. 14, 2013.
(Continued)

*Primary Examiner* — Tan Ho
(74) *Attorney, Agent, or Firm* — Keating & Bennett, LLP

(57) ABSTRACT

A resonant circuit and an antenna device achieve a low resonance frequency without increasing a coil size, and improve communication performance. In the resonant circuit, two coil-shaped conductors are arranged so as to be opposed to each other with a dielectric sheet interposed therebetween. The two coil-shaped conductors are, at the opposed portions thereof, coupled with a capacitance interposed therebetween, and wound so that electric currents flowing through the respective conductors trend in the same direction in a planar view. The opposed area in at least a portion of the outermost windings and/or innermost windings of the coil-shaped conductors is larger as compared with the opposed area in any other winding, and the respective ends of the conductors define power feeding units.

21 Claims, 12 Drawing Sheets

(56) References Cited

U.S. PATENT DOCUMENTS

| | | | |
|---|---|---|---|
| 4,666,735 A * | 5/1987 | Hoover et al. | 427/510 |
| 4,792,790 A | 12/1988 | Reeb | |
| 2008/0246673 A1 | 10/2008 | Kagaya et al. | |
| 2009/0027208 A1 * | 1/2009 | Martin et al. | 340/572.5 |
| 2009/0315680 A1 * | 12/2009 | Arimura | 340/10.1 |
| 2010/0283698 A1 | 11/2010 | Orihara | |

FOREIGN PATENT DOCUMENTS

| | | |
|---|---|---|
| EP | 0 280 361 A1 | 8/1988 |
| EP | 1 085 480 A1 | 3/2001 |
| EP | 1 770 666 A2 | 4/2007 |
| GB | 2 197 565 A | 5/1988 |
| GB | 2 353 920 A | 3/2001 |
| JP | 2001-084463 A | 3/2001 |
| JP | 2002-109492 A | 4/2002 |
| JP | 2004-048233 A | 2/2004 |
| JP | 2008-278447 A | 11/2008 |
| JP | 2009-105774 A | 5/2009 |
| WO | 86/03052 A1 | 5/1986 |

OTHER PUBLICATIONS

Official Communication issued in International Patent Application No. PCT/JP2011/067254, mailed on Nov. 1, 2011.

Kato et al, "Antenna and Antenna Module", U.S. Appl. No. 13/334,462, filed Dec. 22, 2011.

Kato et al, "Antenna and Wireless IC Device", U.S. Appl. No. 13/190,670, filed Jul. 26, 2011.

* cited by examiner

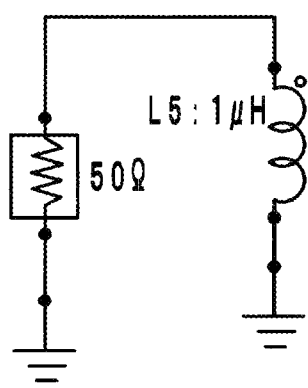
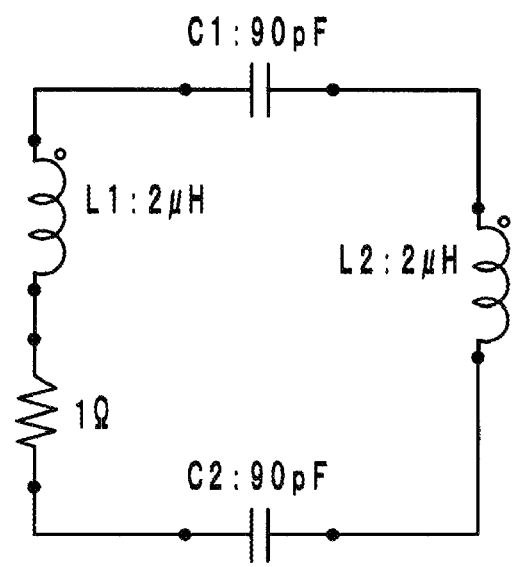
FIG. 2

FIG. 4
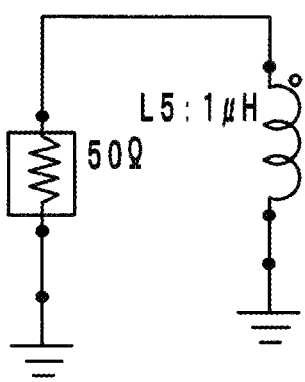
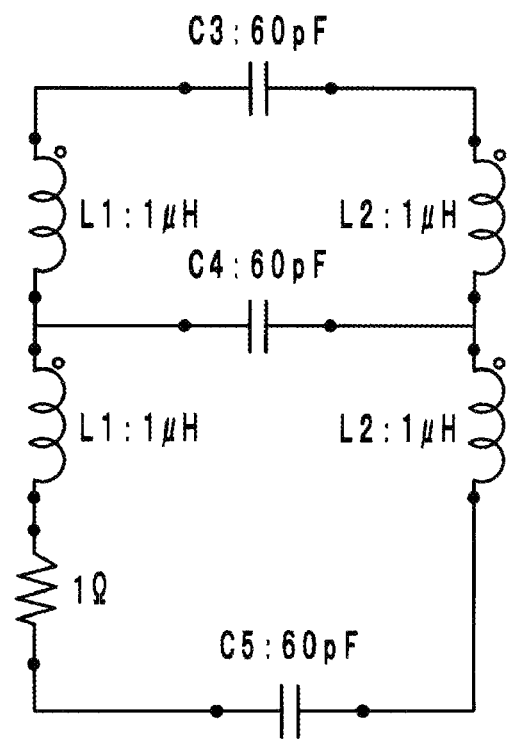
FIG. 5
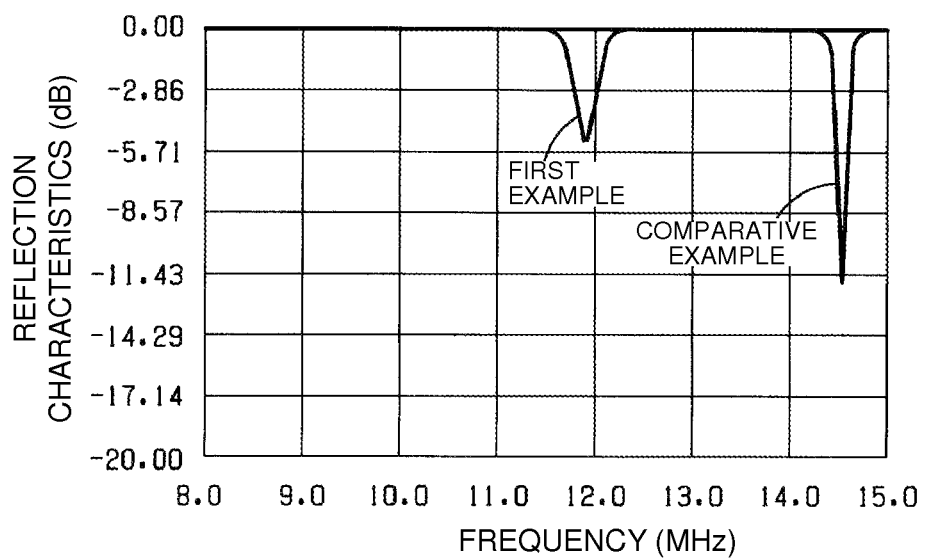

FIG. 8A
FIG. 8B
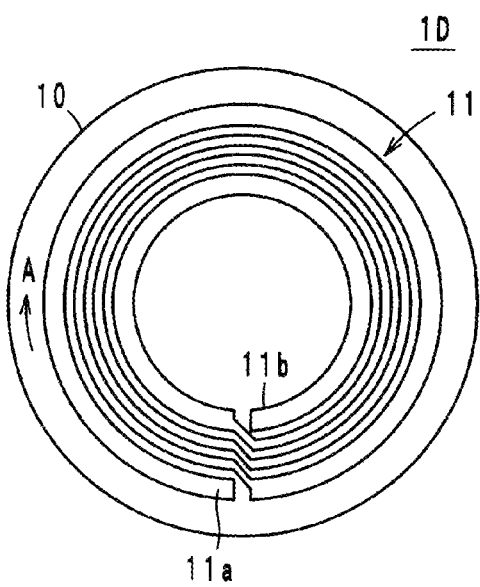
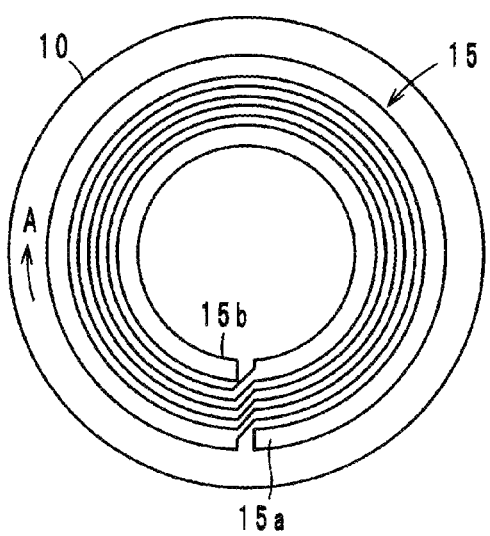

RESONANT CIRCUIT AND ANTENNA DEVICE

BACKGROUND OF THE INVENTION

1. Field of the Invention

The present invention relates to a resonant circuit and an antenna device, and more particularly, relates to a resonant circuit for a wireless IC device preferably for use in an RFID (Radio Frequency Identification) system, and an antenna device including the resonant circuit.

2. Description of the Related Art

Conventionally, as management systems for goods, RFID systems have been developed for transmitting information via non-contact communication between a reader/writer for generating electromagnetic waves and wireless ICs (referred to as IC tags, wireless IC devices, etc.) for storing predetermined information, which are attached to goods or containers. The wireless IC coupled with an antenna allows communication with the reader/writer.

This type of antenna is set to have a resonance frequency that is based on the frequency of communication signals, and basically configured to generate, together with coil-shaped conductors wound on a plane surface, a capacitance for setting the inductance of the coil-shaped conductors as well as the resonance frequency.

For example, Japanese Patent Application Laid-Open No. 2001-84463 discloses a resonant circuit with coils thick in line width and short in length, which are formed on both sides of a film, and are capacitively coupled with each other. This resonant circuit functions as an antenna, and in order to lower the resonance frequency, the coils are increased in size, because there is a need for coils with a large L value or a need to increase the C value between the respective coils. However, this has the problem of degrading communication characteristics because the size of the antenna is increased, and because the opening of the coils is reduced.

SUMMARY OF THE INVENTION

Therefore, preferred embodiments of the present invention provide a resonant circuit and an antenna device which achieve a low resonance frequency without increasing the size of a coil, and improve communication performance.

A resonant circuit according to a first preferred embodiment of the present invention includes two coil-shaped conductors opposed to and coupled with each other with a capacitance interposed therebetween, wherein the two coil-shaped conductors are wound so that an opposed area in at least a portion of outermost windings and/or innermost windings of the conductors is larger as compared with an opposed area in any other winding, and so that electric currents flowing through the respective conductors trend in the same direction in a planar view from one direction.

An antenna device according to a second preferred embodiment of the present invention includes the resonant circuit according to the above-described preferred embodiment of the present invention and a power feeding circuit magnetically coupled with the resonant circuit.

The resonance circuit is set to have a predetermined resonance frequency by the inductance of the two coil-shaped conductors and the capacitance generated between the both coil-shaped conductors opposed to each other. The capacitance is increased in the opposed sections of the outermost windings and/or innermost windings of the coil-shaped conductors, and decreased in the middle sections thereof. On the other hand, the coil-shaped conductors undergo an increase in inductance. Therefore, the resonance frequency can be decreased without increasing the size of the coil-shaped conductors. In other words, the size (area) of the coil-shaped conductors, which is required to achieve a predetermined resonance frequency, can be reduced, thus leading to a reduction in the size of the antenna device. In addition, the opening area of the coil-shaped conductors is increased, thus improving the communication characteristic because of more fluxes passing through the opening.

According to various preferred embodiments of the present invention, a low resonance frequency is achieved without increasing the size of the coil, and an improvement in communication performance is achieved.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1A is a plan view of a front-side coil conductor, whereas FIG. 1B is a plan view (perspective from the front surface) of a back-side coil conductor.

FIG. 2 is an equivalent circuit diagram of a resonant circuit according to a first example of a preferred embodiment of the present invention.

FIG. 3A is a plan view of a front-side coil conductor, whereas FIG. 3B is a plan view (perspective from the front surface) of a back-side coil conductor.

FIG. 4 is an equivalent circuit diagram of a resonant circuit according to a comparative example.

FIG. 5 is a graph showing reflection characteristics of the resonant circuits according to the first example of a preferred embodiment of the present invention and the comparative example.

FIG. 6A is a plan view of a front-side coil conductor, whereas FIG. 6B is a plan view (perspective from the front surface) of a back-side coil conductor.

FIG. 7A is a plan view of a front-side coil conductor, whereas FIG. 7B is a plan view (perspective from the front surface) of a back-side coil conductor.

FIGS. 8A and 8B show a resonant circuit according to a fourth example of a preferred embodiment of the present invention, where FIG. 8A is a plan view of a front-side coil conductor, whereas FIG. 8B is a plan view (perspective from the front surface) of a back-side coil conductor.

FIG. 14A is a plan view, whereas FIG. 14B is a cross-sectional view.

FIG. 15A is a plan view, whereas FIG. 15B is a cross-sectional view.

DETAILED DESCRIPTION OF THE PREFERRED EMBODIMENTS

Examples of a resonant circuit and an antenna device according to preferred embodiments of the present invention will be described below with reference to the accompanying drawings. It is to be noted that the same members and sections are denoted by common reference symbols in the respective drawings, and repeated explanations will be left out.

Figure 1A:
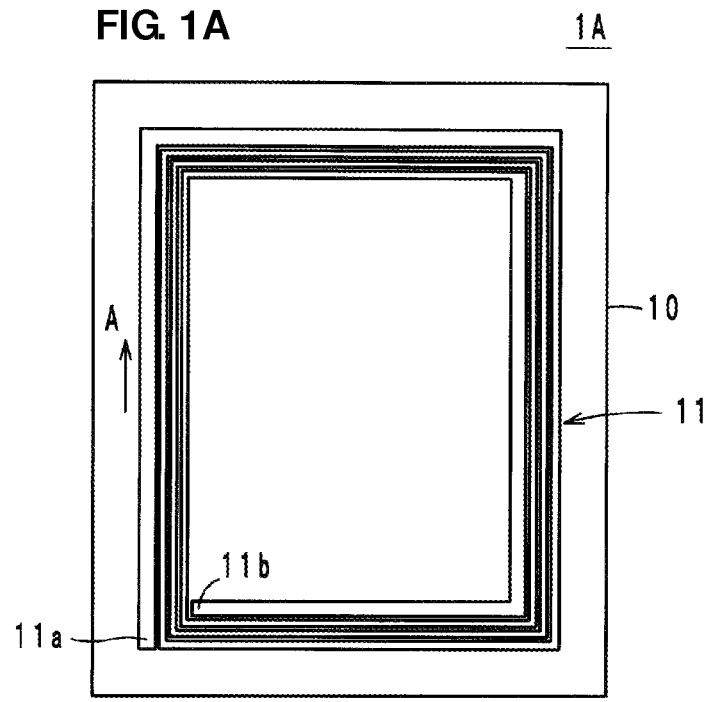
FIGS. 1A and 1B show a resonant circuit according to a first example of a preferred embodiment of the present invention, where
Figure 1B:
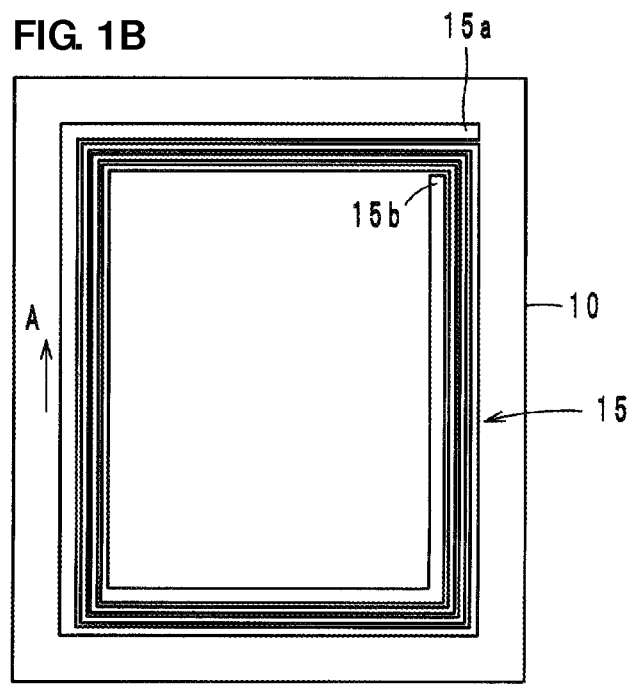

A resonance circuit 1A according to a first example of a preferred embodiment of the present invention includes, as shown in FIGS. 1A and 1B, a front-side coil-shaped conductor 11 and a back-side coil-shaped conductor 15 in cuboid shapes, which are arranged on the front and back surfaces of a dielectric sheet 10 so as to be opposed to each other. The coil-shaped conductors 11, 15 preferably are respectively wound four turns, for example, from first ends 11a, 15a to second ends 11b, 15b, and coupled with capacitance interposed therebetween so as to be opposed to each other. In the coil-shaped conductors 11, 15, the opposed section is preferably equal or substantially equal in conductor width, and the outermost windings and the innermost windings are preferably configured in a line shape, and each arranged so that two sides are thicker in conductor width than any other winding.

The coil-shaped conductors 11, 15 have power feeding circuits, not shown, electrically connected to the respective ends 11a, 15b, and an electric current flows through the front-side coil-shaped conductor 11 in the direction of an arrow A with a power feeding unit 11a as a starting point, whereas an electric current flows through the back-side coil-shaped conductor 15 in the direction of an arrow A with a power feeding unit 15b as a starting point. More specifically, the two coil-shaped conductors 11, 15 preferably are wound more than one turn so that electric currents flowing therethrough trend in the same direction in a planar view from one direction.

For the dielectric sheet 10, various resin materials can be used, and in particular, it is preferable to use a liquid crystal polymer sheet which has liquid crystal molecules oriented in a planar direction, for example. This liquid crystal polymer sheet undergoes an extremely small change in dimension in the thickness direction with respect to a temperature cycle and with respect to water absorption, and the change is thus reduced in capacitance value generated between the respective lines. Therefore, the frequency characteristics are stabilized. The coil-shaped conductors 11, 15 can be easily formed preferably by attaching copper foil or aluminum foil onto the sheet 10 or printing a conductive paste onto the sheet 10, for example. Thin-film formation methods may be adopted, such as a photolithographic approach, for example. In addition, the dielectric sheet 10 may preferably be made of paper, for example.

The resonance circuit 1A according to the first example of a preferred embodiment of the present invention preferably is set to have a predetermined resonance frequency that is determined by the inductances L1, L2 of the two coil-shaped conductors 11, 15 and the capacitances C1, C2 generated between the both coil-shaped conductors 11, 15 opposed to each other in an equivalent circuit as shown in FIG. 2. Accordingly, high-frequency signals of predetermined frequencies, which are input from the power feeding units 11a, 15b, are radiated from the coil-shaped conductors 11, 15, and the high-frequency signals of predetermined frequencies, which are received by the coil-shaped conductors 11, 15, are supplied from the power feeding units 11a, 15b to the power feeding circuits.

Further, the capacitance is increased in the opposed sections of the outermost windings and innermost windings of the coil-shaped conductors 11, 15 (capacitances C1, C2), and decreased in the middle sections thereof. On the other hand, the coil-shaped conductors 11, 15 undergo an increase in inductances L1, L2. Therefore, the resonance frequency can be decreased without increasing the sizes of the coil-shaped conductors 11, 15. In other words, the conductor size (area) can be reduced which is required to achieve a predetermined resonance frequency, thus leading to a reduction in the size of an antenna device. In addition, the opening area of the coil-shaped conductors 11, 15 is increased, thus improving the communication characteristic because of more fluxes passing through the opening.

Figure 3A:
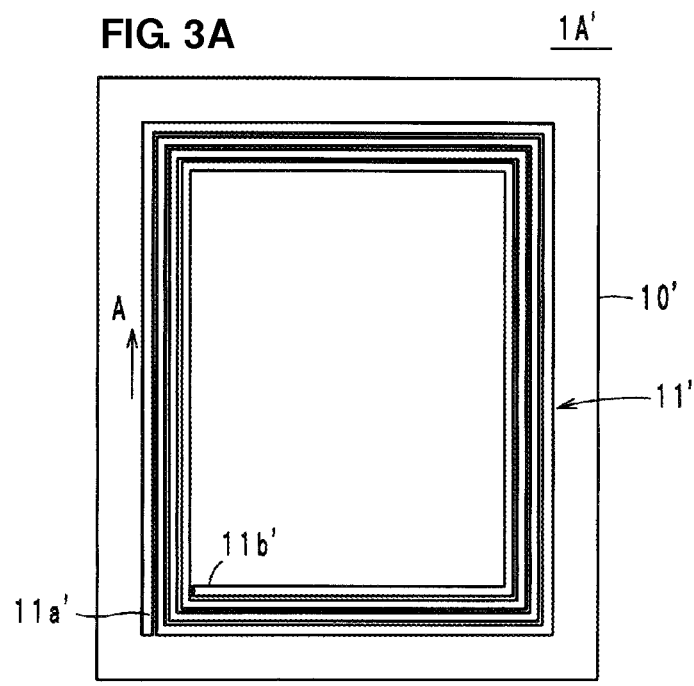
FIGS. 3A and 3B show a resonant circuit according to a comparative example, where
Figure 3B:
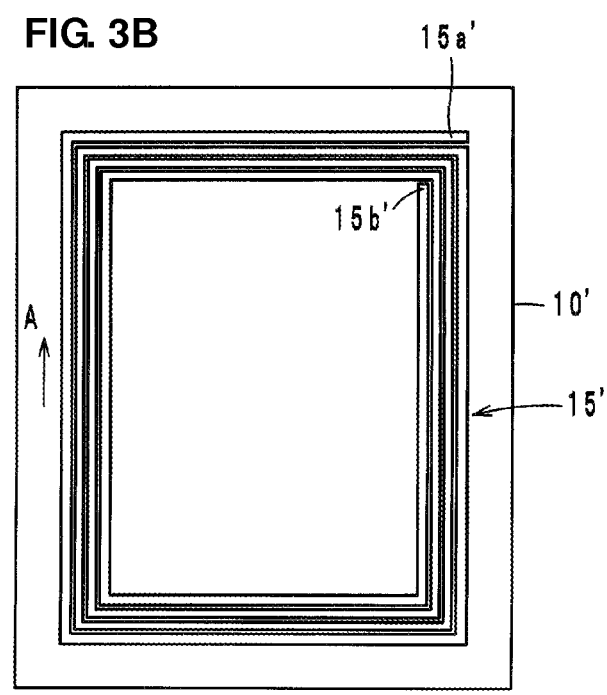

Now, FIGS. 3A and 3B illustrate a resonant circuit 1A' according to a comparative example. This resonant circuit includes a front-side coil-shaped conductor 11' and a back-side coil-shaped conductor 15' in cuboid shapes, which are arranged on the front-side and back-side of a dielectric sheet 10' so as to be opposed to each other, and the coil-shaped conductors 11', 15' are preferably equal or substantially equal in conductor width over the entire winding, while the other sections thereof preferably are configured in the same manner as in the first example of a preferred embodiment of the present invention. The equivalent circuit according to the comparative example as shown in FIG. 4 is set to have a predetermined resonance frequency determined by the inductances L1, L2 of the two coil-shaped conductors 11', 15' and the capacitances C3, C4, and C5 generated between the both coil-shaped conductors 11', 15' opposed to each other. In the comparative example, the capacitance C4 is also formed in the middle section between the inductances L1, L2.

As is clear from a comparison made between the equivalent circuit according to the first example of a preferred embodiment of the present invention (see FIG. 2) and the equivalent circuit according to the comparative example (see FIG. 4), the two resonant circuits 1A, 1A' have the same inductance and capacitance respectively when the inductors L1, L2 are considered to be connected in series and when the capacitors C1, C2, C3 to C5 are considered to be connected in parallel. However, there is almost no capacitance in the middle section in the case of the first example of a preferred embodiment of the present invention, whereas there is the capacitance C4 in the middle section in the case of the comparative example. Therefore, even when the coil-shaped conductors have the same size, the resonance frequency is relatively high in the comparative example, whereas the resonance frequency is relatively low in the first example of a preferred embodiment of the present invention. It is to be noted that FIGS. 2 and 4 also show therein together a power feeding circuit including an inductor L5 magnetically coupled to the inductor L1.

Here are the dimensions in the first example of a preferred embodiment of the present invention and the comparative example, as well as inductance values and capacitance values in those examples. In the first example of a preferred embodiment of the present invention, the front-side coil-shaped conductor 11 preferably has an area of about 639.68 mm², the back-side coil-shaped conductor 15 preferably has an area of about 636.48 mm², and the opening preferably has an area of about 1214 mm². In the comparative example, the front-side coil-shaped conductor 11' has an area of 639.8 mm², the back-side coil-shaped conductor 15' has an area of 636.6 mm², and the opening has an area of 1214 mm². The respective inductors and capacitors take values as shown in FIGS. 2 and 4, and the resonance frequency preferably is about 11.95 MHz in the first example of a preferred embodiment of the present invention, whereas the resonance frequency is 14.59 MHz in the comparative example.

In addition, the first example of a preferred embodiment of the present invention and the comparative example have reflection characteristics respectively as shown in FIG. 5. The first example of a preferred embodiment of the present invention preferably has a reflection characteristic of about −6.52 dB at about 11.95 MHz, whereas the comparative example has a reflection characteristic of −12.91 dB at 14.59 MHz.

In the first example of a preferred embodiment of the present invention, a low resonance frequency can be achieved without increasing the sizes of the coil-shaped conductors 11, 15 so much, and at the same resonance frequency, the area of the coil opening can be increased to achieve an improvement in communication performance. In addition, in the front and back coil-shaped conductors 11, 15, electric currents flow in the same direction, and the directions of the magnetic fields thus coincide with each other, thus improving the degree of coupling the coil-shaped conductors 11, 15. In addition, the coil-shaped conductors 11, 15 include the power feeding units 11a, 15a arranged substantially on the diagonal line, and a balance in the number of turns can be thus achieved between the coil-shaped conductors 11, 15.

It is to be noted that in the two coil-shaped conductors 11, 15 located on the front and back surfaces of the dielectric sheet 10, only the conductor widths of the outermost windings may be thicker than the conductor width of any other winding, or only the conductor widths of the innermost windings may be thicker than the conductor width of any other winding, for example. In addition, it is not always necessary that the middle sections of the respective coil-shaped conductors 11, 15 should be opposed to each other. In these respects, the same applies in each example to be described below.

Furthermore, while the outermost windings and innermost windings of the coil-shaped conductors 11, 15 preferably have only the two sides uniformly thickened respectively with the ends 11a, 11b, 15a, and 15b as starting points in the first example of a preferred embodiment of the present invention, any of the sides may be thickened optionally. More specifically, it is only preferable for the outermost windings and/or the innermost windings to have a line shape, either partially or over the entire lengths thereof, thicker in conductor width than any other winding. In addition, the thickness may be accurately uniform, or may include concavity and convexity in the width direction, which preferably is substantially uniform.

Figure 6A:
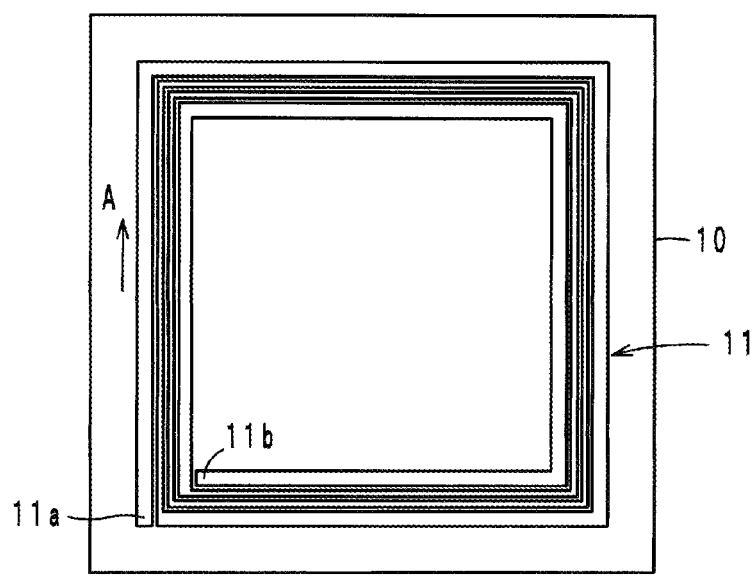
FIGS. 6A and 6B show a resonant circuit according to a second example of a preferred embodiment of the present invention, where
Figure 6B:
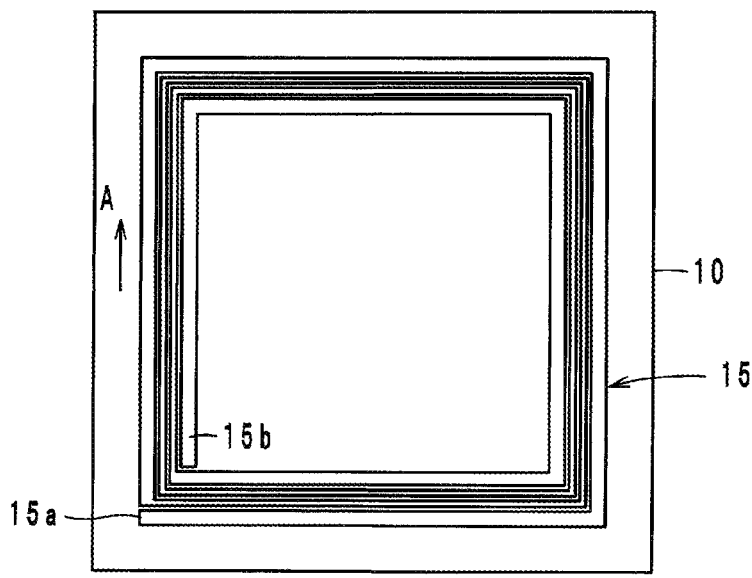

A resonant circuit 1B according to a second example of a preferred embodiment of the present invention includes, as shown in FIGS. 6A and 6B, coil-shaped conductors 11, 15 preferably in the shape of a quadrangle, which are located respectively on the front and back surfaces of a dielectric sheet 10 so as to be opposed to each other, and the four sides of the outermost winding and the four sides of the innermost winding are preferably thicker than the any other winding in conductor width. The other configuration, and also the advantageous functional effects thereof, are preferably provided in the same way as in the case of the first example of a preferred embodiment of the present invention.

Figure 7A:
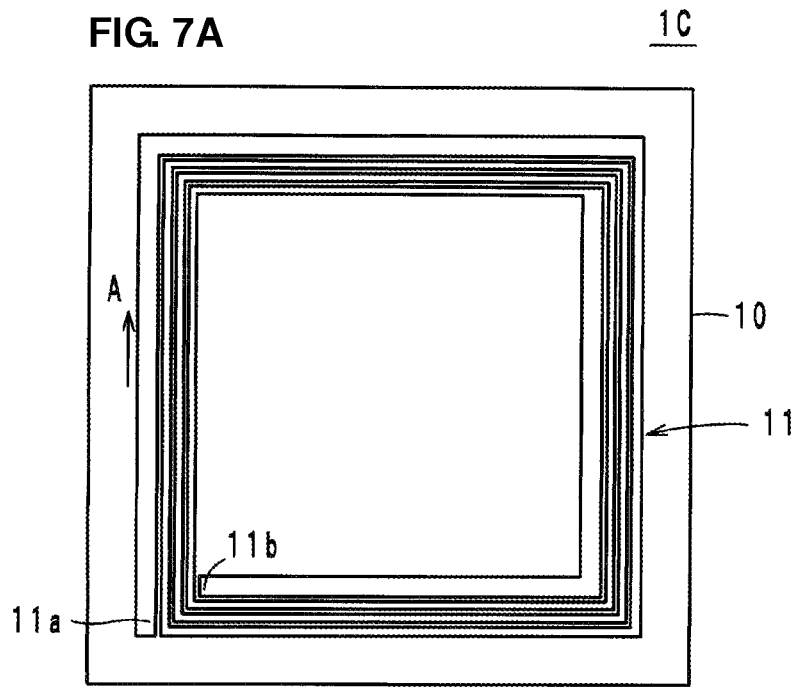
FIGS. 7A and 7B show a resonant circuit according to a third example of a preferred embodiment of the present invention, where
Figure 7B:
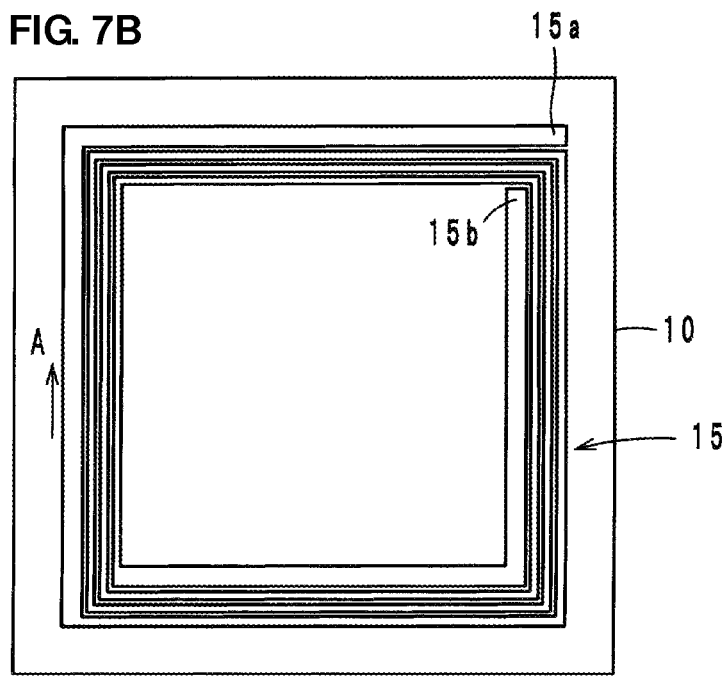

A resonant circuit 1C according to a third example of a preferred embodiment of the present invention preferably includes, as shown in FIGS. 7A and 7B, coil-shaped conductors 11, 15 preferably in the shape of a quadrangle, which are located respectively on the front and back surfaces of a dielectric sheet 10 so as to be opposed to each other. The other configuration, and also the advantageous functional effects thereof, preferably are provided in the same way as in the case of the first example of a preferred embodiment of the present invention. It is to be noted that when a comparison is made between the second example of a preferred embodiment of the present invention described previously and the present third example of a preferred embodiment of the present invention, the power feeding units 11a, 15b are preferably provided on the diagonal line in the third example of a preferred embodiment of the present invention, whereas the power feeding units are preferably provided on one corner in the second example of a preferred embodiment of the present invention.

A resonant circuit 1D according to a fourth example of a preferred embodiment of the present invention includes, as shown in FIGS. 8A and 8B, coil-shaped conductors 11, 15 preferably in the shape of a circle, which are located respectively on the front and back surfaces of a dielectric sheet 10 so as to be opposed to each other, and the outermost winding and the innermost winding are preferably thicker than the any other winding in conductor width. The other configuration, and also the advantageous functional effects thereof, are preferably provided in the same way as in the case of the first example of a preferred embodiment of the present invention.

Figure 9:
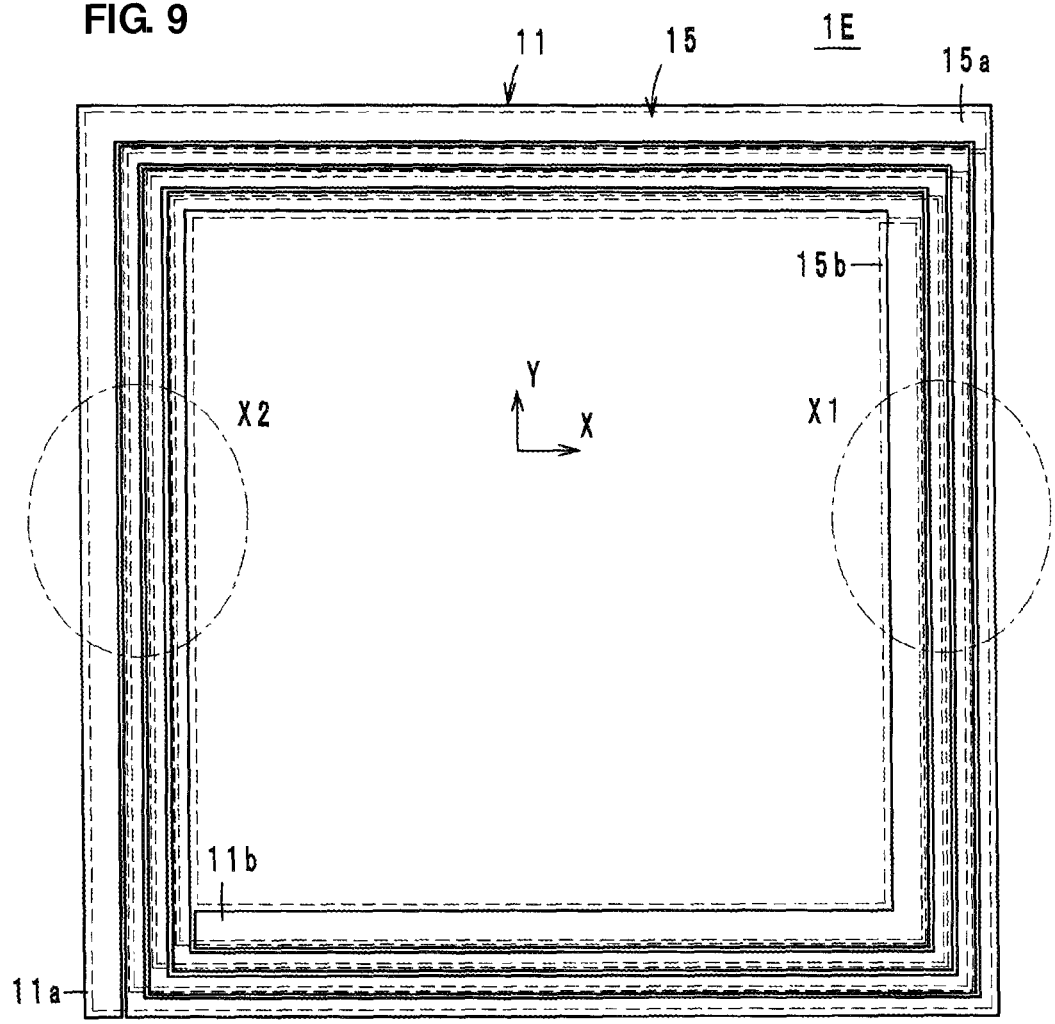
FIG. 9 is a plan view illustrating a resonant circuit according to a fifth example of a preferred embodiment of the present invention.

A resonant circuit 1E according to a fifth example of a preferred embodiment of the present invention is, as shown in FIG. 9, configured in such a way that, of coil-shaped conductors 11, located respectively on the front and back surfaces of a dielectric sheet 10, the back-side coil-shaped conductor 15 (indicated by a dotted line) preferably is equal or substantially equal in conductor width and pitch as the front-side coil-shaped conductor 11, and configured to have a smaller outline than the front-side coil-shaped conductor 11. The other configuration is preferably provided in the same way as in the case of the third example of a preferred embodiment of the present invention.

The advantageous functional effects of the present fifth example of a preferred embodiment of the present invention preferably are basically provided in the same way as in the first example of a preferred embodiment of the present invention described previously, and in particular, with one coil-shaped conductor 15 made slightly smaller than the other coil-shaped conductor 11, the overall capacitance value will not be changed significantly even when the coil-shaped conductors 11, 15 are arranged to be deviated form each other on the front and back surfaces of the dielectric sheet 10, and the deviation of the resonance frequency can be thus prevented. For example, when the back-side coil-shaped conductor 15 is slightly deviated in the X direction, the capacitance value of an X1 section will be increased, whereas the capacitance value of an X2 section will be decreased. Likewise in the case of a deviation in the direction of an arrow Y, the overall capacitance value will not be changed significantly.

Figure 10:
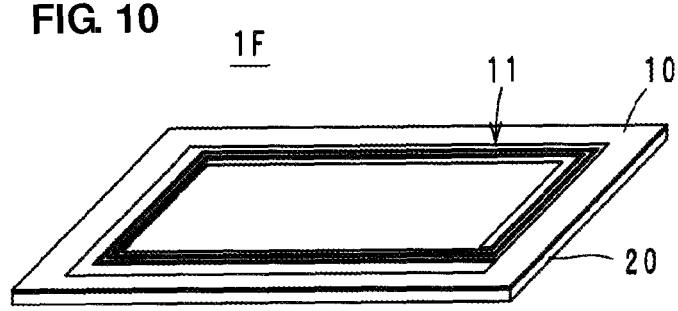
FIG. 10 is a perspective view illustrating a resonant circuit according to a sixth example of a preferred embodiment of the present invention.

A resonant circuit 1F according to a sixth example of a preferred embodiment of the present invention includes, as shown in FIG. 10, a magnetic sheet 20 located, for example, so as to face the back-side coil-shaped conductor 15 of the resonant circuit 1A shown in FIG. 1. The arrangement of the magnetic sheet 20 increases the inductance value, and decreases the resonance frequency. Thus, at the same resonance frequency, the opening area of the coil-shaped conductors 11, 15 can be increased, thus resulting in an improvement in communication performance. In addition, although the communication performance is degraded when there is a metal material near the resonant circuit 1F, this degradation can be significantly reduced and prevented by providing the magnetic sheet 20.

Figure 11:
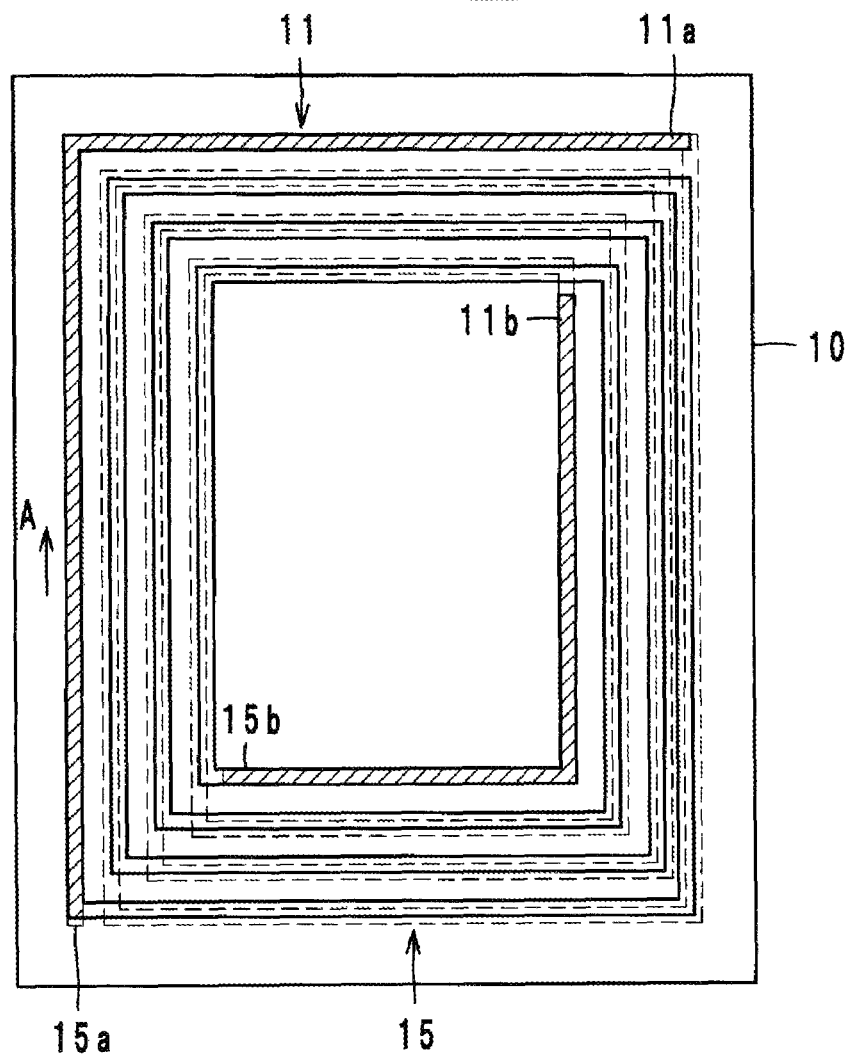
FIG. 11 is a plan view illustrating a resonant circuit according to a seventh example of a preferred embodiment of the present invention.

A resonant circuit 1G according to a seventh example of a preferred embodiment of the present invention is, as shown in FIG. 11, configured so that a coil-shaped conductor 11 provided on the front surface of a dielectric sheet 10 and a coil-shaped conductor 15 provided on the back surface thereof both have the same conductor width, and so that two sides of the outermost layer and of innermost layer (shaded sections in FIG. 11) have larger opposed areas than the opposed area of any other winding. More specifically, the two shaded sides are overlapped with each other in a planar view, whereas the other sections are overlapped with each other with a deviation from each other in the planar view. The other configuration, and also the advantageous functional effects thereof, are preferably provided in the same way as in the case of the first example of a preferred embodiment of the present invention.

Figure 12:
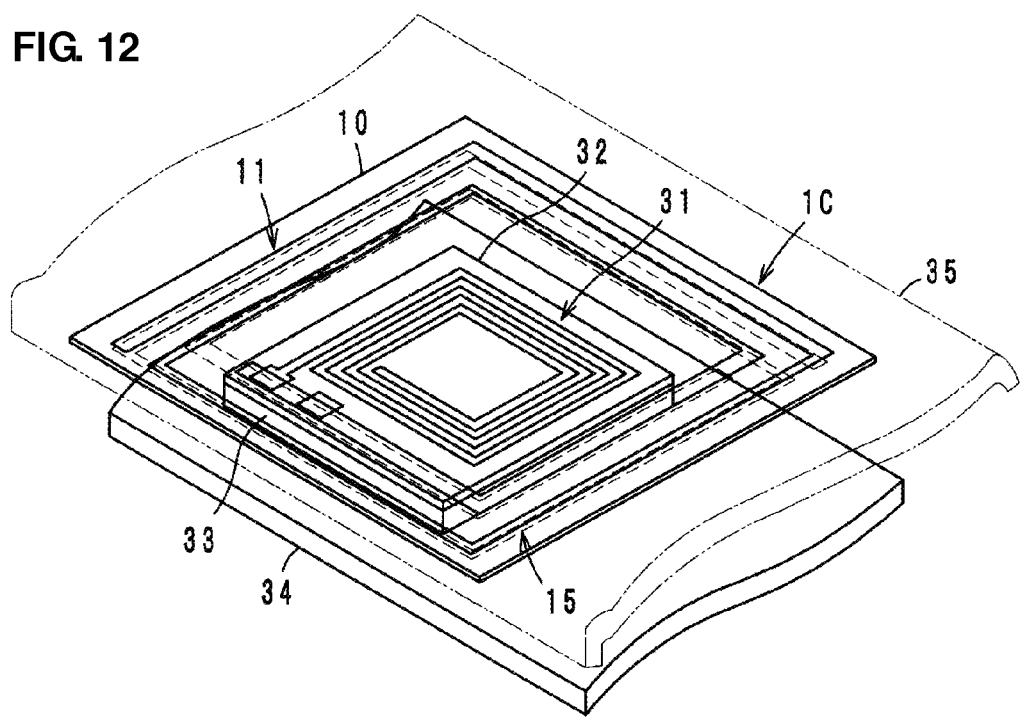
FIG. 12 is a perspective view illustrating a first example of an antenna device including the resonant circuit according to the third example of a preferred embodiment of the present invention.
Figure 13:
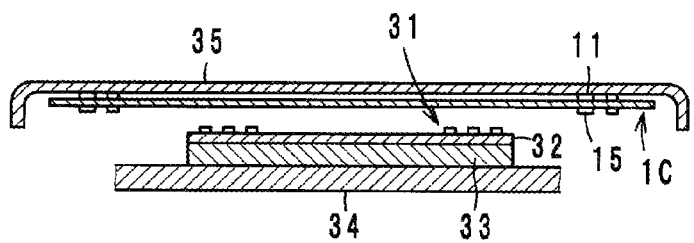
FIG. 13 is a cross-sectional view of the antenna device shown in FIG. 12.

FIGS. 12 and 13 show therein a first example of an antenna device including the resonant circuit 1C according to the third example of a preferred embodiment of the present invention described previously. This antenna device preferably is intended for use as an antenna of a mobile communication device, in which the resonant circuit 1C is used as a boost antenna to amplify a magnetic field radiated from a coil-shaped base antenna 31, for example. The base antenna 31 preferably includes a coil conductor located on the front surface of a flexible resin sheet 32, with a magnetic sheet 33 located on the back surface of the resin sheet 32, and mounted on a circuit board 34 with the magnetic sheet 33 interposed therebetween. On the other hand, the resonant circuit 1C is located inside a housing 35 of the mobile communication device.

The base antenna 31 includes the coil conductor which defines and functions as an inductor, and is magnetically coupled, as the inductor L5 shown in the equivalent circuit of FIG. 2, with the coil conductor 11 of the resonant circuit 1C in close proximity, and connected to a power feeding unit, not shown.

In the thus configured antenna device, when the resonance frequency of the resonant circuit 1C is made coincident with the resonance frequency of the base antenna 31, the resonant circuit 1C amplifies high-frequency signals radiated from the base antenna 31, and radiates the amplified signals to the outside. This allows longer-distance and wider area communications than in the case of the base antenna 31 only, and thus can achieve an antenna device which becomes less likely to be affected externally.

Figure 14A:
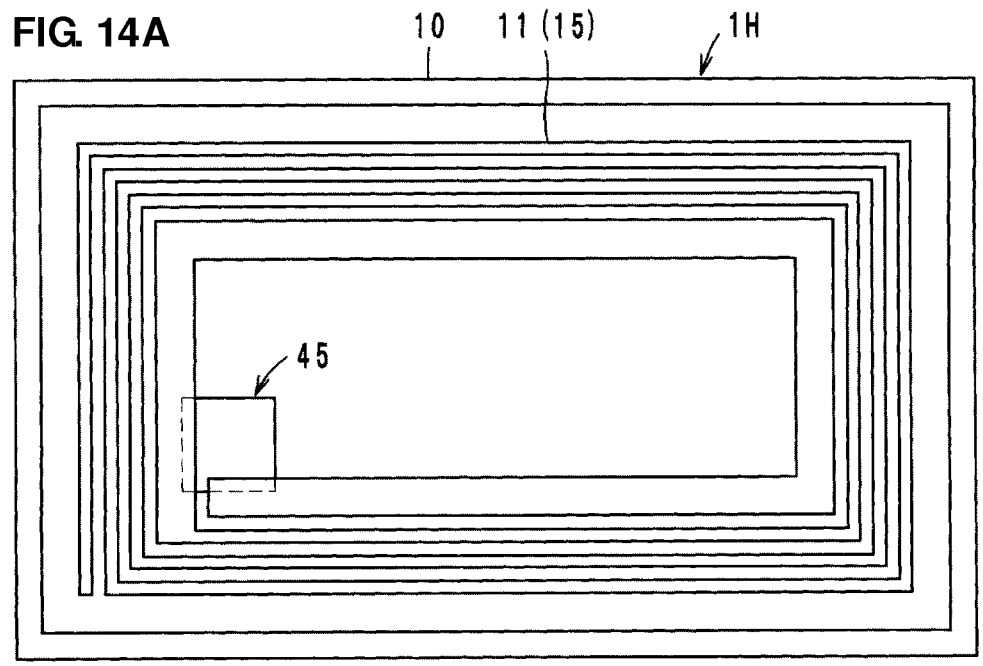
FIGS. 14A and 14B illustrate a second example of an antenna device according to a preferred embodiment of the present invention including a resonant circuit, where
Figure 14B:
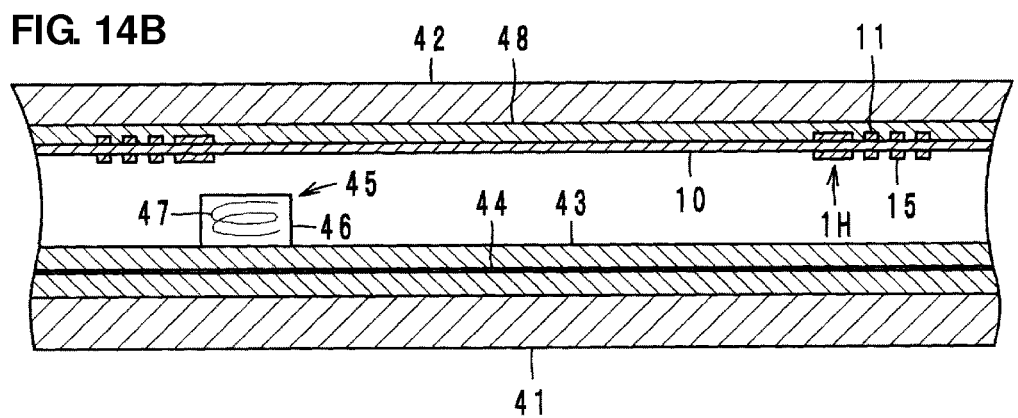

FIGS. 14A and 14B show therein a second example of the antenna device of a preferred embodiment of the present invention. This antenna device preferably is intended for use as an antenna of a mobile communication device, for example, and a power feeding coil 45 with a coil conductor 47 built in a magnetic core is mounted on a printed wiring board 43 located inside housings 41, 42 of the mobile communication device. The power feeding coil 45 is connected to a wireless communication element (an RFIC chip), not shown. A ground conductor 44 built in the printed wiring board 43 preferably functions as the ground for various types of electronic circuits such as a power supply circuit and a liquid-crystal driver device, not shown, which are mounted on the printed wiring board 43.

A resonant circuit 1H includes coil-shaped conductors 11, 15 located on the front and back surfaces of a dielectric sheet 10 so as to be opposed to and coupled with each other with a capacitance interposed therebetween, and the innermost wirings of the coil-shaped conductors 11, 15 are preferably thicker in conductor width than any other winding thereof. The resonant circuit 1H is attached to the inside of the housing 42 with an adhesive 48, and the coil-shaped conductors 11, 15 are magnetically coupled with the power feeding coil 45.

The power feeding coil 45 preferably is arranged so that the winding axis of the built-in coil conductor 47 runs in approximately the same direction as the winding axis of the coil-shaped conductors 11, 15, and preferably arranged so as to be overlapped with the innermost windings of the coil-shaped conductors 11, 15 in the coil opening of the coil-shaped conductors 11, 15 in a planar view as shown in FIG. 14A. The power feeding coil 45 defines and functions as a base antenna, whereas the coil-shaped conductors 11, 15 magnetically coupled with the power feeding coil 45 define and function as a boost antenna, for example. Because the power feeding coil 45 is magnetically coupled with the coil-shaped conductors 11, 15 at the innermost windings thereof which are thicker in conductor width, the magnetic loop going around the power feeding coil 45 and the coil-shaped conductors 11, 15 is increased to increase the degree of coupling therebetween, thus resulting in a reduction in loss and an increase in communication distance.

Figure 15A:
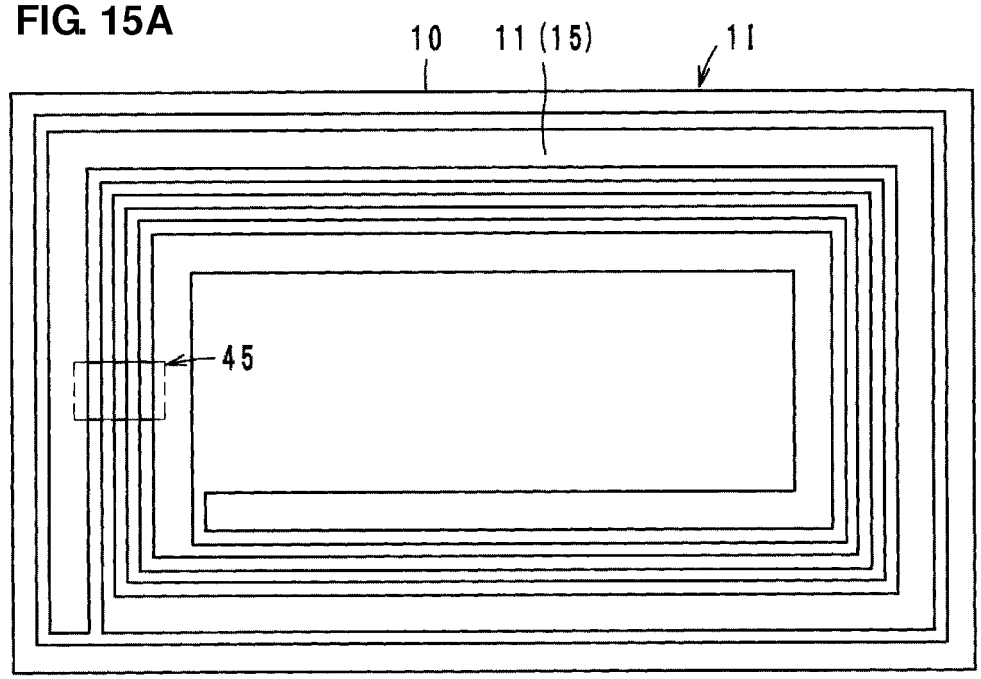
FIGS. 15A and 15B illustrate a third example of an antenna device according to a preferred embodiment of the present invention including a resonant circuit, where
Figure 15B:
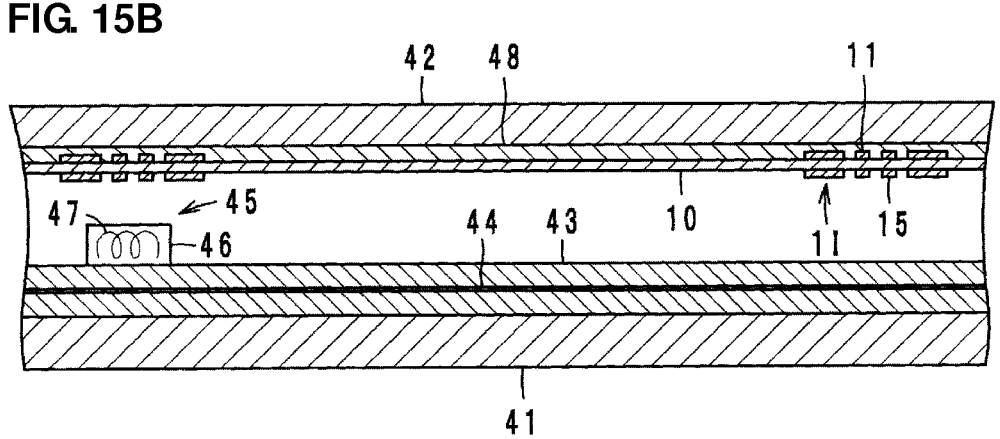

FIGS. 15A and 15B show therein a third example of the antenna device according to a preferred embodiment of the present invention. This antenna device preferably is intended for use as an antenna of a mobile communication device, for example, and a power feeding coil 45 with a coil conductor 47 built in a magnetic core 46 is mounted on a printed wiring board 43 disposed inside housings 41, 42 of the mobile communication device. The power feeding coil 45 is connected to a wireless communication element (an RFIC chip), not shown. A ground conductor 44 built in the printed wiring board 43 defines and functions as the ground for various types of electronic circuits such as a power supply circuit and a liquid-crystal driver device, not shown, which are mounted on the printed wiring board 43, for example.

A resonant circuit 1I includes coil-shaped conductors 11, 15 located on the front and back surfaces of a dielectric sheet 10 so as to be opposed to and coupled with each other with a capacitance interposed therebetween, and the innermost wirings and outermost windings of the coil-shaped conductors 11, 15 are preferably thicker in conductor width than any other winding thereof. The resonant circuit 1I is attached to the inside of the housing 42 preferably with an adhesive 48, and the coil-shaped conductors 11, 15 are magnetically coupled with the power feeding coil 45.

The power feeding coil 45 is arranged so that the winding axis of the built-in coil conductor 47 extends in approximately the same direction as the winding axis of the coil-shaped conductors 11, 15, and arranged so that in a planar view as shown in FIG. 15A, one end of the coil conductor 47 is overlapped with the outermost windings of the coil-shaped conductors 11, 15, whereas the other end thereof is overlapped with the innermost windings thereof. The power feeding coil 45 defines and functions as a base antenna, whereas the coil-shaped conductors 11, 15 magnetically coupled with the power feeding coil 45 define and function as a boost antenna, for example. Because the power feeding coil 45 is magnetically coupled with the coil-shaped conductors 11, 15 at the outermost windings and innermost windings thereof which are thicker in conductor width, the magnetic loop going around the power feeding coil 45 and the coil-shaped conductors 11, 15 is increased to increase the degree of coupling therebetween, thus resulting in a reduction in loss and an increase in communication distance.

It is to be noted that the resonant circuit and antenna device according to the present invention are not to be considered limited to the examples of preferred embodiments described previously, and various modifications can be made within the spirit of the present invention.

As described above, various preferred embodiments of the present invention are useful for resonant circuits and antenna devices, for example, and excellent in terms of achieving a low resonance frequency without increasing the size of the coil, and in terms of improving communication performance.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A resonant circuit comprising:
   two coil-shaped conductors opposed to and coupled with each other with a capacitance interposed therebetween; wherein
   the two coil-shaped conductors are wound so that an opposed area in at least a portion of outermost windings and innermost windings of the conductors is larger than an opposed area in any other winding, and so that electric currents flowing through the respective conductors trend in a same direction in a planar view from one direction.

2. The resonant circuit according to claim 1, wherein the outermost windings and innermost windings of the two coil-shaped conductors are line-shaped and thicker in conductor width than any other winding.

3. The resonant circuit according to claim 1, wherein the two coil-shaped conductors are wound more than one turn, and outermost and innermost turns of the two coil-shaped conductors are thicker in conductor width than any other turn.

4. The resonant circuit according to claim 1, wherein the outermost windings and innermost windings of the two coil-shaped conductors are, over entire lengths thereof, thicker in conductor width than any other winding.

5. The resonant circuit according to claim 1, wherein the outermost windings and innermost windings of the two coil-shaped conductors are partly thicker in conductor width than any other winding.

6. The resonant circuit according to claim 1, wherein a portion of the outermost windings and innermost windings of the two coil-shaped conductors is uniform or substantially uniform in thickness, the portion being thicker in conductor width than any other winding.

7. The resonant circuit according to claim 1, wherein the two coil-shaped conductors are equal or substantially equal to each other in opposed conductor width.

8. The resonant circuit according to claim 7, wherein the two coil-shaped conductors have a same or substantially the same conductor width, and the outermost windings and innermost windings of the conductors are at least partly larger in opposed area than any other winding.

9. The resonant circuit according to claim 7, wherein the outermost windings and innermost windings of the two coil-shaped conductors are at least partly overlapped with each other in a planar view and overlapped with each other with a deviation from each other that is greater than that in any other winding in the planar view.

10. The resonant circuit according to claim 1, wherein the two coil-shaped conductors include respective ends arranged on a diagonal line.

11. The resonant circuit according to claim 1, wherein one of the two coil-shaped conductors is equal or substantially equal in conductor width and pitch to the other coil-shaped conductor, and smaller in outline than the other coil-shaped conductor.

12. The resonant circuit according to claim 1, further comprising a magnetic body that is opposed to at least one of the two coil-shaped conductors.

13. The resonant circuit according to claim 1, wherein the two coil-shaped conductors are opposed to each other with a dielectric sheet interposed therebetween.

14. The resonant circuit according to claim 1, wherein a coil opening is located in a center of the two coil-shaped conductors.

15. An antenna device comprising:
    a resonant circuit; and
    a power feeding circuit magnetically coupled with the resonant circuit; wherein
    the resonant circuit includes two coil-shaped conductors opposed to and coupled with each other with a capacitance interposed therebetween; and
    the two coil-shaped conductors are wound so that an opposed area in at least a portion of outermost windings and innermost windings of the conductors is larger than an opposed area in any other winding, and so that electric currents flowing through the conductors trend in a same direction in a planar view from one direction.

16. The antenna device according to claim 15, wherein the outermost windings and innermost windings of the two coil-shaped conductors are line-shaped and thicker in conductor width than any other winding.

17. The antenna device according to claim 15, wherein the two coil-shaped conductors have a same or substantially the same conductor width, and the outermost windings and innermost windings of the conductors are at least partly larger in opposed area than any other winding.

18. The antenna device according to claim 15, wherein one of the two coil-shaped conductors is equal or substantially equal in conductor width and pitch to the other coil-shaped conductor, and smaller in outline than the other coil-shaped conductor.

19. The antenna device according to claim 15, further comprising a magnetic body that is opposed to at least one of the two coil-shaped conductors.

20. The antenna device according to claim 15, wherein the two coil-shaped conductors are opposed to each other with a dielectric sheet interposed therebetween.

21. A mobile communication device comprising:
    an antenna device including:
        a resonant circuit; and
        a power feeding circuit magnetically coupled with the resonant circuit; wherein
    the resonant circuit includes two coil-shaped conductors opposed to and coupled with each other with a capacitance interposed therebetween; and
    the two coil-shaped conductors are wound so that an opposed area in at least a portion of outermost windings and innermost windings of the conductors is larger than an opposed area in any other winding, and so that electric currents flowing through the conductors trend in a same direction in a planar view from one direction.

* * * * *